Nov. 7, 1933.  M. S. BAKER  1,934,476

BRAKE

Filed Oct. 24, 1930

INVENTOR.
MALVERN S. BAKER
BY M.W. McConkey
ATTORNEY

Patented Nov. 7, 1933

1,934,476

UNITED STATES PATENT OFFICE 1,934,476

BRAKE

Malvern S. Baker, South Bend, Ind., assignor to Bendix Brake Company, South Bend, Ind., a corporation of Illinois Application October 24, 1930. Serial No. 490,892

1 Claim. (Cl. 188—78)

This invention relates to brakes and is illustrated as embodied in an internal expanding automobile brake of the shiftable-anchorage type. An object of the invention is to provide simple and positive applying means for the brake, preferably of a type which can balance its action on the opposite brake shoes or their equivalent to permit the shifting of the anchorage without interference with the application of brake applying force.

In one desirable arrangement the brake is applied by means such as a lever extending between the ends of the shoes, or equivalent parts of the friction means, and which acts on said ends by thrust members which are seated in notches in the sides of the lever and in said ends respectively. Preferably, the thrust members are also notched at their ends to embrace the lever and the shoe ends.

The above and other objects and features of the invention, including various novel and desirable details of construction, will be apparent from the following description of the illustrative embodiment shown in the accompanying drawing, in which.

Figure 1:
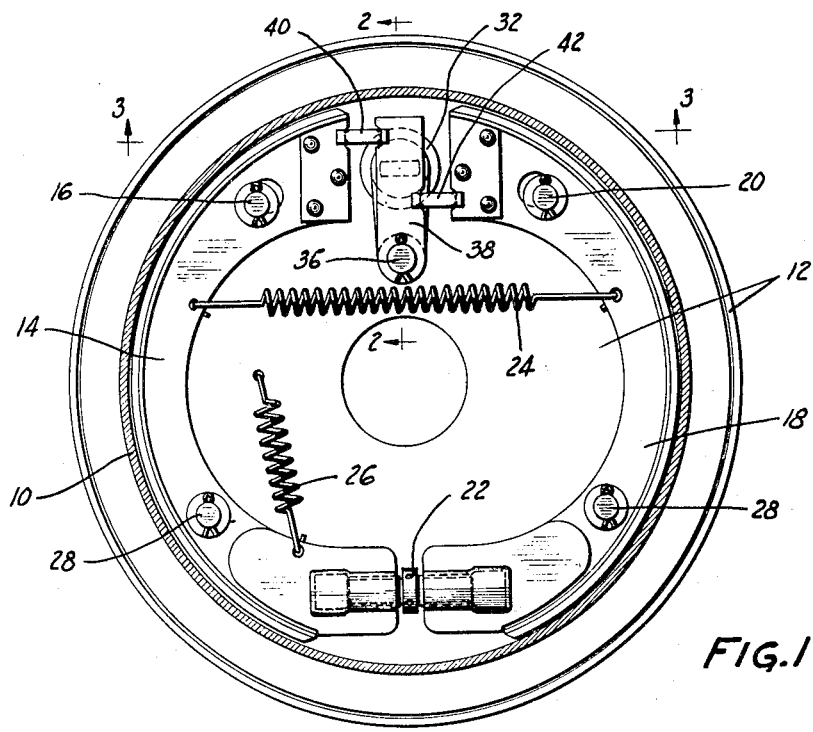
Figure 1 is a vertical section through the brake just inside the head of the brake drum and showing the brake shoes in side elevation.

The illustrated brake includes a rotatable drum 10, at the open side of which is a suitable support such as a backing plate 12 and within which is arranged the friction means of the brake. The particular friction means illustrated includes a shoe 14 adapted to anchor on a fixed anchor post 16 when the drum is turning clockwise and a shoe 18 adapted to anchor on an anchor post 20 when the drum is turning counterclockwise, the shoes being connected by any suitable adjustable pivot joint 22 and urged toward their released positions by a main return spring 24 connected between the shoes and an auxiliary return spring 26 connected between the shoe 14 and the backing plate 12. The shoes may be provided with steady rests or other positioning devices 28 of any desired form.

Figures 2, 3:
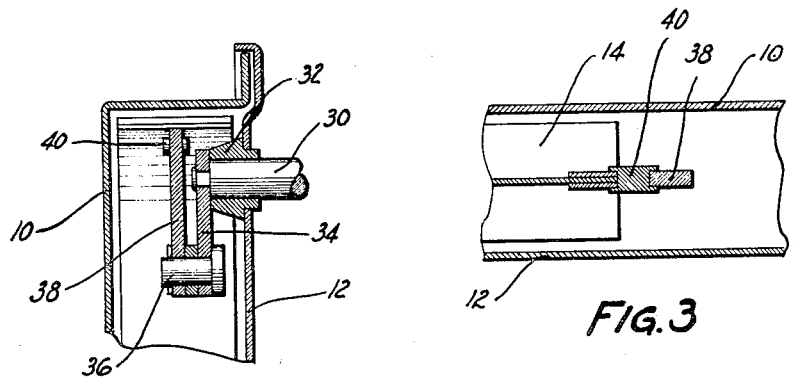
Figure 2 is a partial section on the line 2—2 of Figure 1 and showing the novel brake applying lever.
Figure 3 is a partial section on the line 3—3 of Figure 1 showing the notching of one of the thrust members.

According to the present invention, the brake is applied by novel means shown as operated by a shaft 30 journaled in a bearing 32 mounted on the backing plate 12, and having fixedly secured to its end a crank arm 34 connected at its lower end by a pivot 36 to a novel floating lever 38 which extends upwardly between the ends of the shoes 14 and 16. The lever 38 acts on the shoes through thrust members or links 40 and 42 which are seated as shown in Figure 1 in aligned pairs of notches, one notch of each pair being formed in the end of one of the shoes 14 or 18 and the corresponding notch being formed in the corresponding side of the floating lever 38. Preferably, the thrust members 42 are notched at their ends as shown in Figure 3 to embrace the shoe end and the side of the lever 38.

It will be noted that the lever 38, when it is operated by the shaft 30, fulcrums on the link 42 to act with approximately a 1 to 1 leverage through the link 40 on the shoe 14, while it fulcrums on the link 40 with approximately a 2 to 1 leverage to act through the link 42 on the shoe 18. The brake is arranged so that the greater leverage is effective when the automobile is moving forward.

While one illustrative embodiment of the invention has been described in detail, it is not my intention to limit its scope to that particular embodiment or otherwise than by the terms of the appended claim. The invention of the present application is junior to application No. 490,885, filed October 24, 1930, by Ludger E. LaBrie.

I claim:

A brake having friction means with adjacent separable ends, in combination with an operating lever extending between said ends, each of said ends and the adjacent side of said lever being formed with aligned notches, together with a pair of thrust members each of which is seated at one end in one of the notches in the friction means and at its opposite end in the corresponding notch in said lever, each of said thrust members being notched at its ends to embrace the lever and the end of the friction means.

MALVERN S. BAKER.